United States Patent

[11] 3,600,765

| [72] | Inventors | Raymond R. Rovinsky<br>Wilkes-Barre;<br>Harry R. Gardner, Jr., Shavertown, both of, Pa. |
|---|---|---|
| [21] | Appl. No. | 787,466 |
| [22] | Filed | Dec. 27, 1968 |
| [45] | Patented | Aug. 24, 1971 |
| [73] | Assignee | American Chain & Cable Company, Inc.<br>Bridgeport, Conn. |

[54] ROPE END COUPLING
11 Claims, 5 Drawing Figs.

[52] U.S. Cl. .................................................. 24/122.6,
24/126
[51] Int. Cl. ........................................... F16g 11/02,
F16g 11/04
[50] Field of Search........................................... 24/122.6,
81.35, 126 L, 136 L; 287/75, 76, 77, 78, 79

[56] References Cited
UNITED STATES PATENTS

| 985,915 | 3/1911 | Marchand | 24/126 L UX |
| 1,863,021 | 6/1932 | Matthes | 24/81.35 UX |
| 2,009,318 | 7/1935 | Highfield | 24/81.35 UX |
| 3,254,383 | 6/1966 | Ehmann | 24/122.6 |
| 3,475,795 | 11/1969 | Youngblood | 24/122.6 |

FOREIGN PATENTS

| 1,380,277 | 10/1964 | France | 24/122.6 |
| 248,185 | 3/1926 | Great Britain | 24/122.6 |

Primary Examiner—Bernard A. Gelak
Attorney—Pennie, Edmonds, Morton, Taylor and Adams ABSTRACT: A rope end coupling composed of a ferrule having a conically shaped bore and a tapered wedge for securing a rope having a plurality of outer strands in the ferrule bore. The tapered wedge includes a plurality of grooves in its outer surface to receive some or all of the strands of the rope and tightly hold them against the ferrule.

Patented Aug. 24, 1971 3,600,765
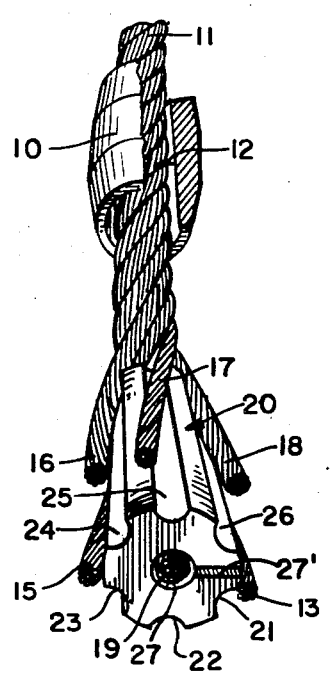
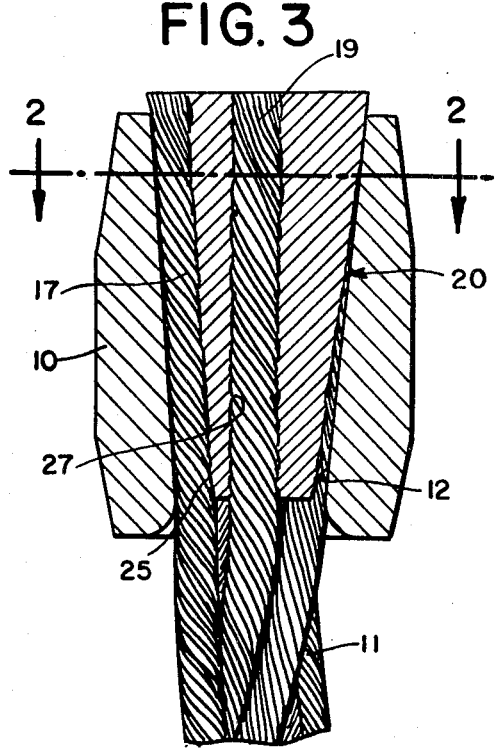
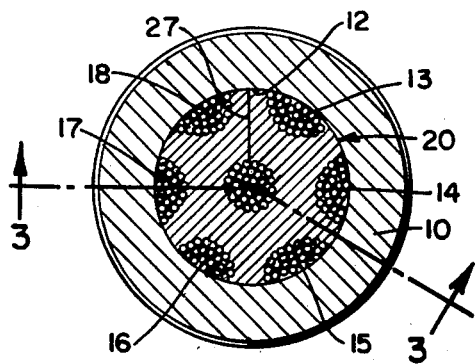
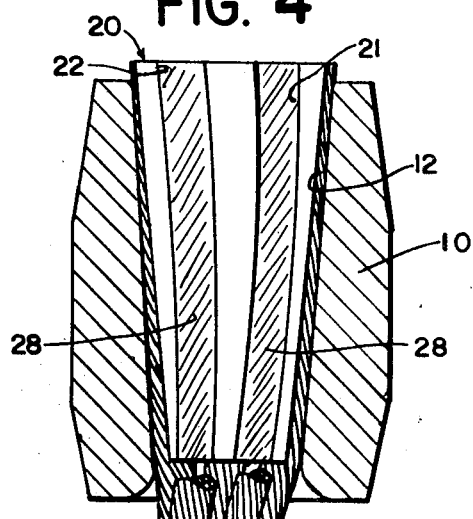
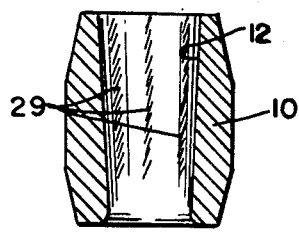
INVENTORS
RAYMOND R. ROVINSKY
HARRY ROBERT GARDNER, JR.
BY
Pennie, Edmonds, Morton, Taylor & Adams
ATTORNEYS

ROPE END COUPLING

BACKGROUND OF THE INVENTION

1. Field of the Invention

This invention relates to end couplings for wire rope strands or cables which can be applied in the field and is capable of developing 100 percent of the rope strength. More particularly, this invention relates to a rope end coupling having a wedge and ferrule in which the wedge is adapted to be inserted into the ferrule to hold the end of the rope passing through the ferrule.

2. Description of the Prior Art

Field applied rope end couplings such as choker sling endings used in the logging industry, which have employed the principle of seating a wedge block in a ferrule sleeve to form the ending for the wire member have too often become the weakest portion of the wire member because the tensile strength of the wire member, which comprises a wire strand or stranded rope or cable has been diminished by the rigors of attaching the end coupling and by the forces exerted on the rope ending by the end coupling during use of the rope. Due to the fact that these field applied end couplings have been unable to develop the full strength of the wire member, industry in some cases has continued to use zinc socketed endings even though it involves the time consuming steps of brooming the wires and acid cleaning. One reason for failure of ferrule wedge type couplings has been due to the excessive stresses produced on specific areas of the cable causing damage and weakening of particular strands of the cable. Excessive stress has resulted in these assemblies because the wedge block and ferrule sleeve have both been made of relatively hard material. As a result of the unyielding nature of both the ferrule and wedge, sharp impingements on the wire rope strands at various points are caused thus weakening the wire and eventually causing breaking of the rope in the end coupling under operating conditions below the rated strength of the rope.

Another reason that the full strength of the wire rope has not been attained in ferrule wedge type couplings is that the angles of the taper of the wedge block and of the ferrule sleeve have been made the same. Here the individual strands of the cable have been weakened and damaged because of the prolonged exposure of the unlaid wire strands on the outer surface of the wedge block to the shearing forces incurred during the telescoping of the wedge block into the ferrule sleeve. Thus, the unlaid strands of cable on the outer surface of the wedge are caused to contact the surface of the bore of the ferrule for the entire period that the wedge is being forcibly driven into the ferrule, with the result that the individual strands of cable are flattened, damaged and weakened as they are driven through the bore in the ferrule. The damage and metal fatigue of the rope which is caused by this abrasive telescoping of the wedge block into the ferrule sleeve is most often greatest at the base of the ferrule sleeve because the wire strands at that point were subjected to abrasion for the longest period. In addition, failure of the wire strands at the base of the ferrule permits the wire strand to pull free of the ferrule more rapidly because it is no longer gripped by any part of the ferrule.

In other rope end coupling devices, helical grooves have been provided in the outer surfaces of the wedge block in an attempt to correct any tendency of the wire rope to become overstressed. However, such wedge blocks are not only unsatisfactory in developing the full breaking strength of the wire rope, they also have the additional drawback that forming of the helical grooves causes increased production costs for the wedge block.

SUMMARY OF THE INVENTION

In accordance with the teachings of the present invention there is provided a rope end coupling which can be applied in the field, which can develop 100 percent of the breaking strength of the rope member and which eliminates metal fatigue and damage to individual rope strands at the narrow end of the wedge during both the positioning of the ferrule sleeve on the tapered wedge block and during use of the rope under tension tending to pull the wedge and rope end through the ferrule sleeve. Broadly stated, the rope end coupling of the present invention comprises a high strength metallic ferrule sleeve with a conically shaped bore and a cooperating ductile metallic wedge tapered to an angle slightly greater than the angle of the ferrule bore. The tapered wedge has a plurality of longitudinally extending linear grooves in its outer surface to receive some or all of the outer strands of the rope member. Due to the ductility of the wedge, these grooves are caused to take on a curved shape from the helix in the strands as the parts are assembled together. In the presently preferred embodiment of the present invention all of the outer wire rope strands are unlaid in separate semicircular grooves of the wedge and the wedge is tapered at an angle of 6° for reception in a ferrule bore tapered at an angle of 4°.

Our rope end coupling has several advantages over the devices of the prior art. It is easy to fabricate straight longitudinal grooves which become curved from the pressure of the helical wire strands when the coupling is assembled and thereby offer resistance to slippage of the wire strands. Also a series of small curved grooves are formed in the large grooves from the imprint of the individual wire strands so that the rope member is not held in the end coupling by frictional forces alone, but rather the materials of the rope member and wedge block are placed in interlocking engagement so that a force equal to the breaking strength of the wire rope is needed to break the end coupling. Further, the differential in taper between the wedge block and ferrule sleeve insures that no pressure will be applied at the base of the ferrule until the load approaches the breaking strength of the rope.

DESCRIPTION OF THE DRAWINGS

FIG. 1 is a perspective view showing how the end coupling is applied to a rope, a portion of the ferrule being broken away;

FIG. 2 is a cross-sectional view of the coupling attached to a rope ending;

FIG. 3 is a cross-sectional view taken along line 3—3 of FIG. 2;

FIG. 4 is a cross-sectional view of the ferrule sleeve only with wire strands 13 and 14 broken away showing the curvature imparted to and the curved grooves imprinted in the wedge block grooves after seating in the ferrule; and FIG. 5 is a cross-sectional view of the ferrule showing the deformation of its inner surface imparted during the seating of the wedge.

DESCRIPTION OF THE PREFERRED EMBODIMENTS

Referring to FIG. 1 it can be seen that the end coupling includes a ferrule sleeve 10 adapted to be slipped over a wire rope 11. The ferrule sleeve has a conical bore 12 and the base of the cone faces toward the end of rope member 11. Ferrule sleeve 10 is made of steel or other high strength material. In the drawings, the outer surface of ferrule sleeve 10 is shown without a connected structure but it will be understood that said ferrule sleeve 10 may be fashioned with a hook or other connecting means, so that it may be attached to a fixed position, pulley or another cable.

The rope member 11 as shown in FIG. 1 has six wire strands 13–18 which have been unwound or unlaid from its central strand or core 19. The strands are, in turn, comprised of a plurality of individual wires helically wound together. The strands of the rope end inserted through the ferrule are adapted to be held therein by a wedge block 20 cooperating with the ferrule sleeve.

The wedge block 20 as shown in FIGS. 1 and 2 includes six longitudinal linear grooves 21–26 for receiving the six outer strands of the rope member. The grooves which are equally spaced about the periphery of the wedge block are semicircular in shape and formed to a radius and depth of about one-half the diameter of outer strands 13–18. The wedge block 20 also has a central bore 27 into which is fitted the core strand 19 of rope member 11. A longitudinal slot 27' extending the entire length of wedge block 20 is provided between longitudinal grooves 22 and 23 which is adapted to close when the coupling is assembled thereby closing central bore 27 upon core strand 19. However, when core strand 19 is a conductor, longitudinal slot 27' is eliminated and central bore 27 is made larger to prevent damaging impingement on the conductor core. With respect to ropes having a fiber or plastic core strand, solid wedge blocks are employed and the core strand appropriately trimmed. The wedge block is of a material which is softer than the ferrule sleeve, such materials being aluminum, copper and zinc alloys.

As shown in FIG. 3, the wedge block 20 is tapered slightly more than conical bore 12 of ferrule sleeve 10, with the diameter of its smaller end being slightly less than the diameter of the wire rope. In a presently preferred embodiment of the invention, the wedge block is tapered at 6° and the bore of the ferrule at 4°. These angles are employed with a wire member having a diameter of 1 ⅜inches. As can be seen in Table I, however, the angles of the tapers and the length of the rope end coupling vary with the diameter of the wire member. However, it has been found that it is important to maintain a difference in the tapered angles of the wedge block and ferrule bore of from 2 to 3°.

TABLE I

| Wire Rope Dia. (in.) | Wedge Angle | Ferrule Angle | Overall Length of Ending (in.) | Breaking Load % of Min. Required |
|---|---|---|---|---|
| 1-3/8 | 6° | 4° | 3-3/16 | 87 |
| 1-3/8 | 10° | 7-3/4° | 5 | 113 |
| 5/8 | 7° | 4-3/4° | 2 | 100 |
| 9/16 | 6° | 4° | 1-1/2 | 99 |
| 9/16 | 6° | 4° | 1-1/2 | 99 |
| 9/16 | 7° | 5° | 1-1/2 | 101 |
| 1/2 | 6° | 4° | 1-7/16 | 90–100 |
| 3/8 | 6° | 4° | 1-1/4 | 92–102 |
| 3/8 | 7° | 5° | 1-1/4 | 91–102 |

This difference in tapering is sufficient to produce a coupling having a breaking strength which is equal to from 90 to 100 percent of the breaking strength of the rope. In addition, wedge block 20 is not as long as ferrule sleeve 10 so that excessive pinching of the wire strands is avoided at the base of the ferrule.

In fitting the end coupling onto the rope member 11 the end of rope member 11 is first passed through the small end of ferrule sleeve 10. Then all of the outer strands are unlaid and core strand 19 is inserted in the central bore of the wedge block 20. The strands 13–18 are then seated in longitudinal grooves 21–26 at the large end of wedge block 20 such that the strands do not overlap into the adjacent groove at the bottom or small end of the wedge block. Ferrule sleeve 10 is then pushed up against wedge block 20 and the ending inserted in a mechanical or hydraulic press to apply sufficient pressure to eventually force approximately 90 percent of the length of wedge block 20 into the ferrule sleeve 10.

The initial seating of wedge block 20 in ferrule sleeve 10 occurs when the wider taper of wedge block 20 causes a temporary impass in entering the more narrowly tapered conical bore 12. As a result of the difference in configuration between wedge block 20 and conical bore 12, greater pressure is initially applied to the upper portions of both members of the coupling and no destructive pressure is exerted upon the wire strands at the narrow end of wedge block 20. Contact between these members causes the wedge to deform and to close the slot 27'; and as the wedge continues to approach a fully seated condition within the ferrule sleeve, the area of applied pressure increases and the outer strands 13–18 of the rope are forced into the longitudinal grooves 21–26 of wedge block 20 causing the grooves to deform due to the helix of the strands, and develop the bow shaped curve shown in FIG. 4. It can also be seen from FIG. 4, where the outer strands 13 and 14 have been cut away, that after the harder ferrule sleeve has been driven over wedge block 20, wire strands 13–18 become imbedded in the longitudinal grooves 21–26 thereby forming small curved grooves 28. Due to the fact that each individual wire strand is seated in one of curved grooves 28, an interlock between rope member 11 and wedge block 20 is formed virtually precluding slippage and making the breaking strength of the end coupling approach the breaking or tensile strength of the wire rope.

In addition, the closing of slot 27' under pressure causes wedge block 20 to contract and securely grip the inner wire strand 19. However, with the wedge block 20 in its operatively seated position in ferrule sleeve 10 as shown in FIG. 3, a portion of its wide end extends from the top of the ferrule and remains so when the rope end coupling is put into service. Due to the fact that wedge block 20 is only partially seated, no destructive pressure is exerted at the base of the ferrule with the result that the wire strands there are free to flex and adjust to bending and fatigue. In this connection, it is to be noted from FIG. 5 that the wire strands have formed slight indentations 29 in the inner surface of the ferrule; but that these indentations do not extend the full length of the ferrule and are not present at its lower end where the ferrule is unopposed by the wedge block. It is only with a load which is near the breaking strength of the rope that the wedge will become fully seated and undue pressure will begin to be exerted on the wire strands at the base or smaller end of conical bore 12 in ferrule sleeve 10.

As can be seen in FIGS. 2 and 3, the final deformation of wedge block 20 which has formed a serrated or notched clamp on each of wire strands 13–18 over their entire exposed area does not disrupt the spacing and symmetry of wire strands 13–18 around the circumference of wedge block 20. As a result of the maintaining of the distribution of wire strands 13–18 around the circumference of wedge block 20, the coupling is not overloaded on one side and the maximum capacity of the ductile wedge block to cold flow and develop grooved seats 28 for the individual wire strands is realized.

In addition, the differential in the tapers of the ferrule and wedge of the coupling of the present invention preserves the integrity and strength of the individual wires during tensioning and seating. Thus, the fact that the tapers of these members are not the same eliminates the situation in their seating where the wires become damaged due to flattening and squeezing thereof between the wedge block and ferrule sleeve. It has been found that after attachment of a coupling having a wedge and ferrule of equal taper, the portion of wire cable proximate the small end of the coupling ending is in a compressed and deformed condition due to the flattening and consequent separation of the individual wires. In contrast, the condition of the wire cable proximate the inner end of the coupling of the present invention, where the taper of the wedge is larger than that of the ferrule sleeve and where the smaller diameter of the wedge is slightly less than that of the wire rope is whole and undisturbed with the original shape of the strands being preserved.

The above description of the present invention has been made with reference to the presently preferred embodiment. However, it is to be understood that various changes can be made thereto without departing from the scope of the invention as set forth in the following claims.

We claim:
1. A rope end coupling comprising:
   a. a high strength ferrule sleeve having conically shaped bore; and
   b. a deformable wedge adapted to be received within the bore of said ferrule sleeve for holding a rope end therein, said wedge being tapered to an angle greater than the angle of taper of the bore in said ferrule sleeve and having:

1. a plurality of longitudinally extending grooves on its outer surface for separately receiving at least some of the outer strands of said rope; and
2. a maximum outer diameter greater than the minimum inner diameter of the bore of said ferrule sleeve and large enough relative to the diameter of the bore of the ferrule sleeve and said rope to prevent movement thereof into opposed relation with the smaller end of said ferrule sleeve under normal operating conditions.

2. A rope end coupling according to claim 1 wherein:
a. all of the outer rope strands are received in separate longitudinally extending grooves in the wedge.

3. A rope end coupling according to claim 2 wherein:
a. the wedge block has a bore extending longitudinally therethrough for receiving the core strand of the wire rope.

4. A rope end coupling according to claim 3 wherein:
a. a longitudinal slot extends the full length of the wedge communicating with the bore.

5. A rope end coupling according to claim 4 wherein:
a. said wedge is of sufficiently deformable material relative to the ferrule sleeve whereby said wedge is deformed to close said slot upon insertion of said wedge with the rope strands received thereon, into operative position within said ferrule sleeve.

6. A rope end coupling according to claim 4 for coupling of a rope having the outer strands wrapped about the longitudinal axis of the rope in a helix said outer strands themselves each being formed from helically wound substrands, wherein:
a. the wedge is of sufficiently deformable material whereby the grooves therein are deformed laterally of the surface of the wedge into a bowed shaped due to the helix of the outer strands and upon insertion of the wedge, with said outer strands received within the grooves, into operative position within said ferrule sleeve.

7. A rope end coupling according to claim 6 wherein:
a. said wedge is of sufficiently deformable material whereby the walls of the grooves therein are deformed about the individual substrands of the outer strands in a helical pattern upon insertion of the wedge into operative position within said ferrule sleeve.

8. A rope end coupling according to claim 7 wherein:
a. the end of the longitudinally extending grooves in the undeformed condition of the wedge are:
1. equally spaced from an adjacent groove about the periphery of the wedge,
2. semicircular in cross section, and
3. formed to a depth equal to approximately one-half the diameter of the outer rope strands.

9. A rope end coupling according to claim 8 wherein:
a. the diameter of the smaller end of said deformed wedge is slightly smaller than the diameter of said rope. 19.

10. A rope end coupling according to claim 9 wherein:
a. the conical bore of the ferrule is tapered at an angle of 4°, and
b. the wedge is tapered at an angle of 6°.

11. A rope end coupling according to claim 10 wherein:
a. the wedge block has a shorter length than the ferrule sleeve.